United States Patent [19]
Femano et al.

[11] Patent Number: 4,943,852
[45] Date of Patent: Jul. 24, 1990

[54] STEREOSCOPIC CONVERTER ASSEMBLY FOR CLOSED CIRCUIT 2-D TELEVISION SYSTEM

[75] Inventors: Philip A. Femano, Nutley; Michael F. Zanakis, Livingston, both of N.J.

[73] Assignee: Eclectica, Inc., Nutley, N.J.

[21] Appl. No.: 254,166

[22] Filed: Oct. 6, 1988

[51] Int. Cl.[5] ............................................. H04N 13/00
[52] U.S. Cl. ......................................... 358/88; 358/91; 358/92
[58] Field of Search ....................... 358/92, 91, 88, 89, 358/335

[56] References Cited

U.S. PATENT DOCUMENTS

| | | | |
|---|---|---|---|
| 3,529,082 | 9/1970 | Hoesli | 358/92 |
| 3,821,466 | 6/1974 | Roese | 358/92 |
| 3,903,358 | 9/1975 | Roese | 358/92 |
| 3,992,573 | 11/1976 | White | 358/92 |
| 4,214,267 | 7/1980 | Roese et al. | 358/92 |

FOREIGN PATENT DOCUMENTS 62-98895 5/1987 Japan .

Primary Examiner—James J. Groody
Assistant Examiner—Victor R. Kostak
Attorney, Agent, or Firm—Michael Ebert

[57] ABSTRACT

A stereosopic (3-D) converter assembly usable in conjunction with a standard 2-D closed circuit TV system in which a video camcorder (video camera+VCR) functions to record moving images of a scene seen through the monocular lens of the video camera and to play back the recording to yield a composite video signal that is fed to a TV monitor on whose screen the images are exhibited. The assembly is constituted by a shuttered binocular optical attachment placed in front of the camera lens, a binocular electro-optical viewer through which the screen of the monitor is seen by an observer, and a controller unit for activating either the attachment or the viewer. In the recording mode of the assembly, the controller unit in response to vertical sync pulses derived from the composite video signal yielded by the camera activates the optical attachment alternately to present to the camera lens left and right eye images of the scene, this action resulting in a 3-D recording. In the playback mode in which the composite video signal from the VCR is fed to the TV monitor, the controller unit in response to vertical sync pulses derived from this composite video signal then activates the viewer alternately to present to the left and right eyes of the observer, the corresponding screen images, thereby affording a stereoscopic presentation.

9 Claims, 3 Drawing Sheets

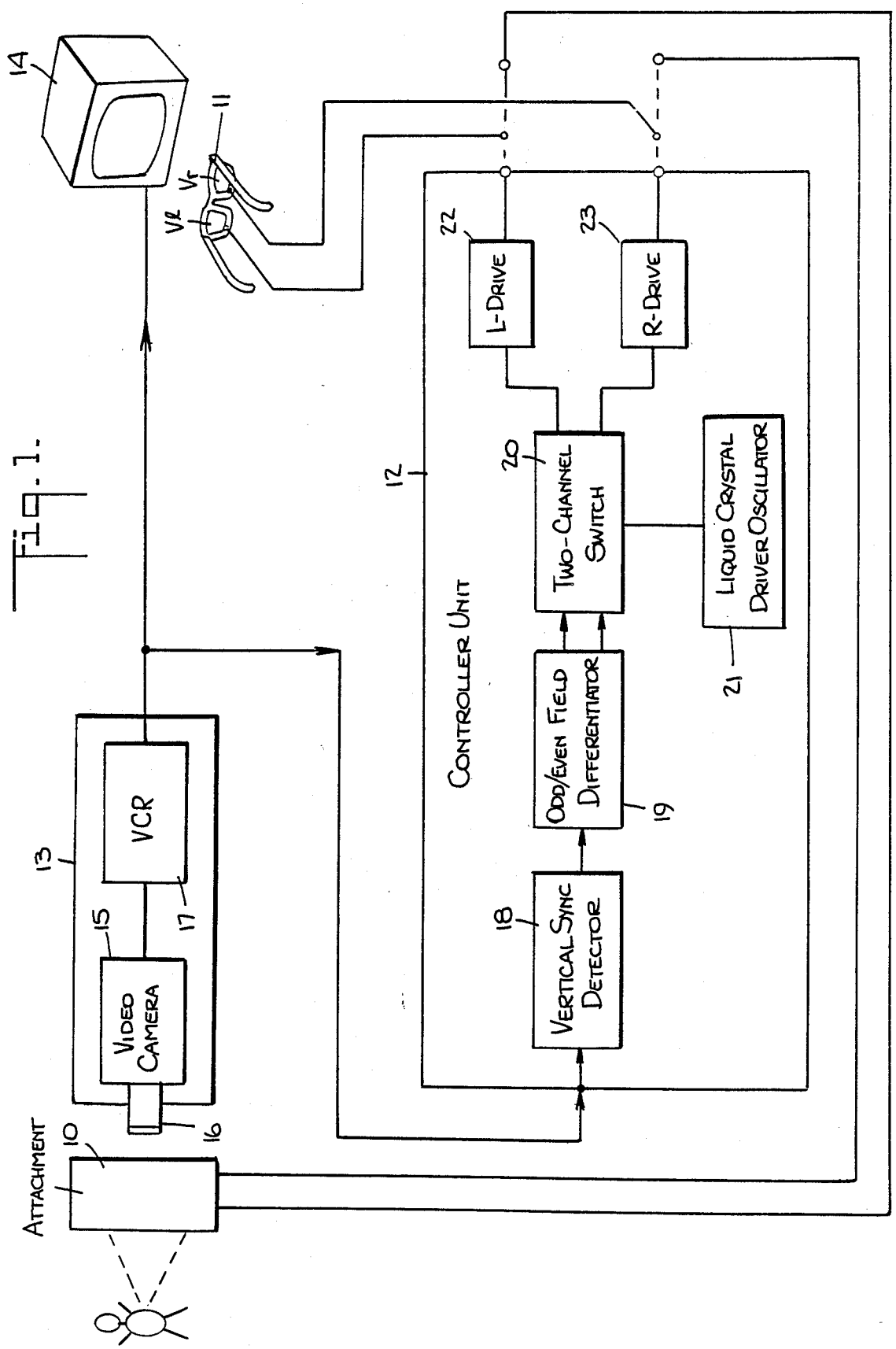

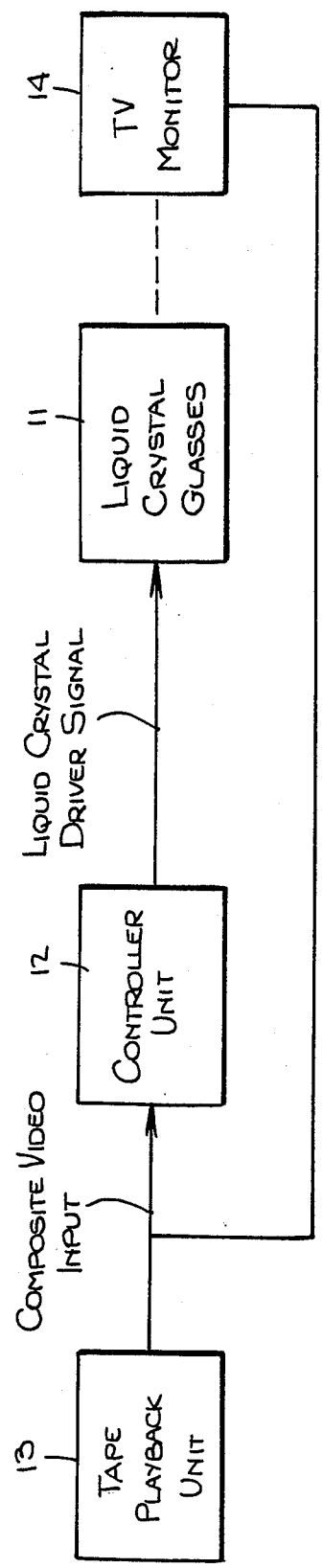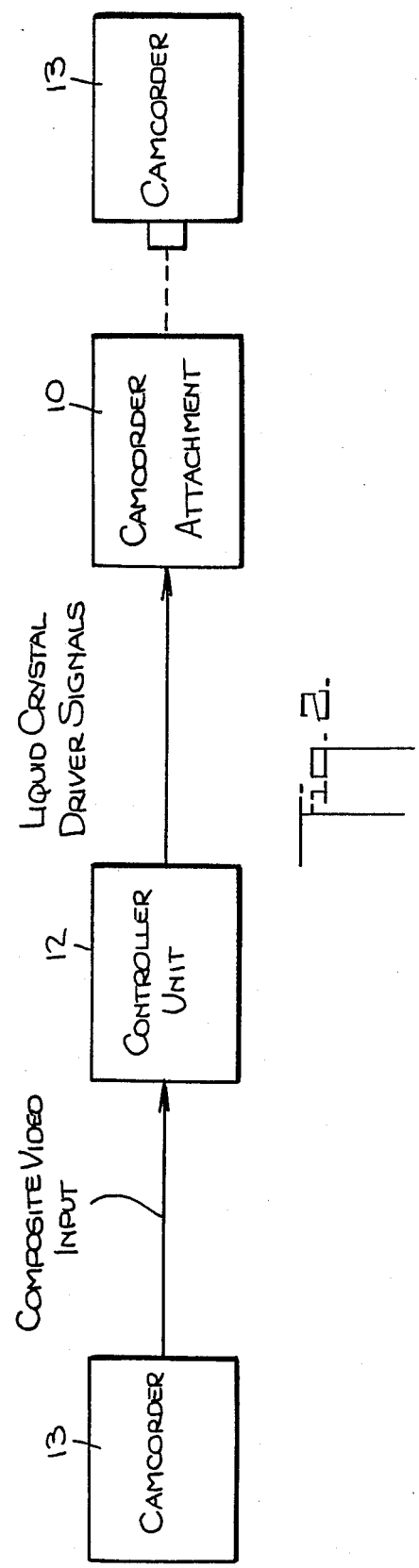

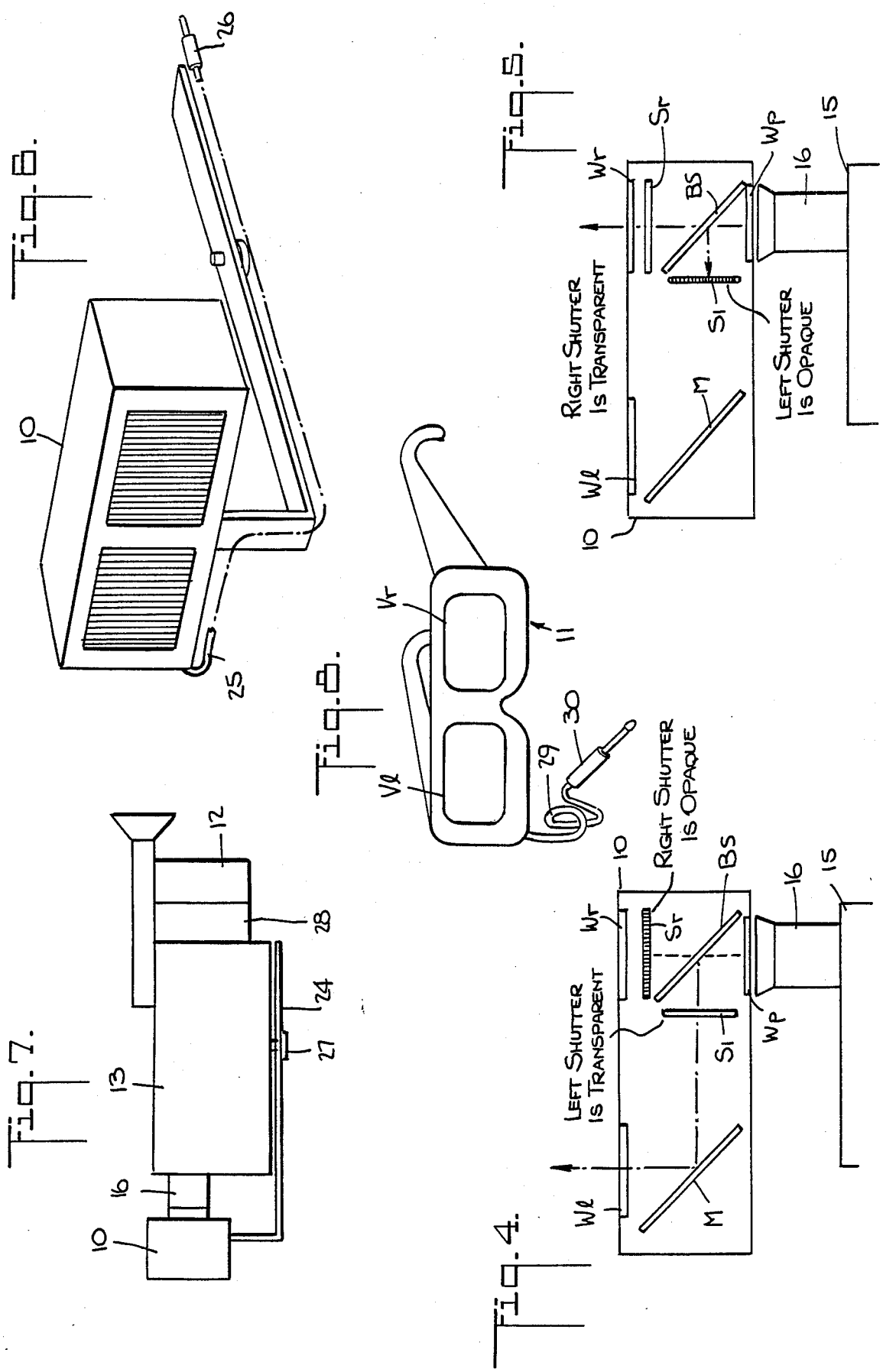

STEREOSCOPIC CONVERTER ASSEMBLY FOR CLOSED CIRCUIT 2-D TELEVISION SYSTEM

BACKGROUND OF INVENTION

1. Field of Invention:

This invention relates generally to stereoscopic (3-D) television systems, and more particularly to a 3-D converter assembly usable in conjunction with a standard 2-D closed circuit television system in which a video camcorder functions to record moving images of a scene and to play back the recording through a TV monitor on whose screen the moving images are exhibited. The assembly in the recording mode causes the system alternately to record left and right images of the scene to produce a 3-D recording which during the playback mode is fed to the TV monitor whose screen exhibits these alternating images which are seen through an electro-optical viewer by an observer to whose left and right eyes are alternately presented the corresponding screen images to provide stereoscopic vision.

2. Status of Prior Art:

As with cinematic motion pictures, a TV system, whether of the 2-D or 3-D type, exploits the phenomenon of visual persistence. The human eye is not instantly responsive to visual stimulus, nor does the sensation of vision disappear immediately upon removal of the stimulus. Because of visual persistence, when images of related but slightly different scenes are received in rapid succession, there is conveyed to the observer the sensation of apparently continuous motion.

If the rate at which the different image is presented to the viewer is relatively slow, the effect of motion is accompanied by flicker. When the image projection rates are sufficiently high, flicker disappears, but the frequency at which this happens depends on the brightness of the field being viewed. Hence the more luminous the field, the higher the flicker or fusion frequency.

The three-dimensional image of an object is observed in a slightly different manner by the pupils of the left and right eyes of the viewer, for these pupils are not coincident. The dissimilarity existing between two simultaneously seen images, each of a different angular perspective, enables the brain to fuse these images so as to create a three-dimensional mental image of the object. The perception of depth thereby gained is referred to as stereoscopic vision.

The reason a conventional TV system is sometimes referred to as cyclopean is that images are viewed by a video camera whose monocular lens function in a manner equivalent to that of a single human eye; hence the 2-D image picked up by this camera and presented on the screen of a TV monitor is lacking in depth. The present invention relates to 3-D or stereoscopic TV systems, and for this purpose the system must be capable of presenting to the left and right eyes of the viewer slightly different images of a scene.

Prior art 3-D television systems, in order to present a viewer with stereoscopic (3-D) TV images, makes use of various methods of image separation and recombination, including electromechanical and electro-optical shutters for this purpose.

Thus, the 1975 U.S. Pat. No. to Roese, 3,903,358, discloses a stereoscopic TV system which functions to present alternate left and right images to a single video camera whose output is fed to a TV monitor. The viewer is provided with eyeglasses having left and right PLZT electro-optic light valves, the opening and closing of which are controlled in synchronism with the left and right image presentations by the TV monitor. In this way, the viewer alternately sees the left and right images and gains depth perception.

As described by Roese and Khalafalia in "Stereoscopic Viewing with PLZT Ceramics," *Ferroelectrics*, Vol. 10 (1976), pp 47–51, these eyeglasses comprise a pair of PLZT (lead lanthanum zirconate titanate) devices that form the eye pieces for the left and right eyes of the wearer. Each device includes an optically cemented assembly of anti-reflective coated glass, a front polarizer, a PLZT ceramic wafer and a rear polarizer. When a high voltage (i.e., 400 V) is applied to the device, it changes its birefringence and thereby the direction of polarization of light incident thereto. Changing the polarization direction of light by the PLZT device causes either the transmission or extinction of the light to provide a shuttering action.

In the Roese '358 patent, in order to effect a left and right eye presentation of the image, use is made of the interlaced pattern of the two scanning fields of a standard TV frame. In a conventional TV system, the scanning lines which form the second field fall between the lines forming the first field and are interlaced therewith, the first and second fields creating a single frame. In the Roese 3-D system, the first field provides the left eye image of a scene, while the second field provides a slightly different right eye image of the same scene.

In the United States, TV standards dictate 30 frames per second, with 525 lines per frame and 262.5 lines per field. Other countries have higher resolution standards. Thus, Great Britain requires 625 lines per frame and 50 fields per second, while in France there are 819 lines per frame and 50 fields per second. The present invention is applicable to any 2-D TV system using alternate fields for the left and right eyes regardless of the national standards imposed on the system.

Also of background interest is the 1973 U.S. Pat. No. to Kratomi, 3,737,567, which discloses a 3-D TV system making use of eyeglasses having left and right liquid-crystal shutters that are alternately opened by a sync signal derived from left and right eye TV images. A similar system is disclosed in the 1971 Hope U.S. Pat. No. 3,621, 127.

The Hope patent as well as the 1984 U.S. Pat. No. 4,424,529 to Roese seek to avoid wired connections between the shuttering glasses and the control unit therefore, and for this purpose the control signals are transmitted. A similar provision to avoid wired connections to the optical shuttering elements is disclosed in the 1981 Jurisson et al. U.S. Pat. No. 4,286,286.

The Jurisson et al. patent is of particular interest. While this patent discloses a pair of video cameras for picking up left and right images of a scene, rather than a single camera for this purpose as in the Roese patent, the Jurisson et al. system is capable of recording the stereoscopic video signals and playing back the recording of the alternate output of the two cameras on a TV monitor which is viewed by shuttered eyeglasses.

U.S. Pat. No. 4,523,226 to Lipton et al. (1985) and the Ikushima et al. U.S. Pat. No. 4,393,400 (1983) are also of interest, for these patents seek to eliminate flicker in a 3-D television system. In Lipton et al., the arrangement is such that each eye sees 60 fields per second, rather than 30 fields per second as in the Roese system. Since 60 fields per second is well above the critical fusion frequency, flicker which may appear in the 3D system of the Roese type is not present. The present invention is also applicable to a flicker-free system of the Lipton et al. type.

SUMMARY OF INVENTION

The primary object of the present invention is to provide a 3-D converter assembly usable in conjunction with a standard 2-D closed circuit television system in which a video camcorder functions to record moving images and to play back the recording to yield a composite video signal that is applied to a TV monitor on whose screen the images are exhibited, the assembly functioning to render the system stereoscopic without, however, modifying the components or circuits thereof.

Television cameras, whether of the studio or portable type, include a lens system, a picture pick-up tube or a solid state pick-up such as a charge coupled device, preamplifiers, scanning circuits and blanking and synchronizing circuits. It is now known to combine a portable video camera with a built-in video cassette tape recorder/playback unit (VCR) to form a unitary, battery-powered device called a video camcorder. A video camcorder is relatively light weight and can be handled by a single individual or stably mounted on a tripod.

A video camcorder in combination with a IV monitor forms a complete closed circuit TV system, for the user can record with this unit moving images and play back the recording to produce video signals which are fed to the TV monitor to exhibit the moving images on its screen. The use of such 2-D video camcorders is now widespread, not only for purposes of entertainment, but also for industrial, educational and scientific purposes. Thus, with a video camcorder, one can record and play back manufacturing operations, educational programs or surgical procedures.

But such standard closed circuit TV systems produce images in two dimensions and deprive the viewer of the dimension of depth. Thus, in the case of a recorded surgical procedure where it is vital that the viewers have full insight to all operational steps taken by the surgeon at the surgical site, the absence of depth perception is a serious drawback.

More particularly, an object of this invention is to provide a 3-D converter assembly for a closed circuit 2-D TV system which in the recording mode causes the video camcorder alternately to record right and left eye images of a scene, and in the playback mode causes the TV monitor associated with the camcorder to exhibit these alternate images which are seen by an observer through electro-optical eyeglasses affording stereoscopic vision.

Also an object of this invention is to provide a converter assembly of the above type which may be manufactured at low cost and which operates reliably and efficiently to impart stereoscopic recording and playback capabilities to a standard 2-D television system.

A significant advantage of the invention is that the binocular optical attachment included in the assembly may be readily coupled to the lens of the video camcorder by affixing the attachment to the tripod mount of the camcorder.

Briefly stated, these objects are attained in a stereoscopic (3-D) converter assembly usable in conjunction with a standard 2-D closed circuit TV system in which a video camcorder (video camera + VCR) functions to record moving images of a scene seen through the monocular lens of the video camera and to play back the recording to yield a composite video signal that is fed to a TV monitor on whose screen the images are exhibited. The assembly is constituted by a shuttered binocular optical attachment placed in front of the camera lens, a binocular electro-optical viewer through which the screen of the monitor is seen by an observer, and a controller unit for activating either the attachment or the viewer.

In the recording mode of the assembly, the controller unit in response to vertical sync pulses derived from the composite video signal yielded by the camera activates the optical attachment alternately to present to the camera lens left and right eye images of the scene, this action resulting in a 3-D recording. In the playback mode in which the composite video signal from the VCR is fed to the TV monitor, the controller unit in response to vertical sync pulses derived from this composite video signal then activates the viewer alternately to present to the left and right eyes of the observer, the corresponding screen images, thereby affording a stereoscopic presentation.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a block diagram of a 3-D converter assembly in accordance with the invention operating in conjunction with a standard 2-D closed circuit TV system in either a recording or a playback mode;

FIG. 2 is a block diagram of the assembly operating in the recording mode;

FIG. 3 is a block diagram of the assembly operating in the playback mode;

FIG. 4 schematically illustrates the optical attachment in relationship to the lens of the video camera when its left shutter is transparent and its right shutter is opaque;

FIG. 5 is the reverse of FIG. 4, the left shutter now being opaque and the right shutter transparent;

FIG. 6 illustrates, in perspective, the mounting bracket which supports the optical attachment, the camcorder being affixed to the bracket;

FIG. 7 schematically illustrates the manner in which the optical attachment, the camcorder and the electronic controller are physically intercoupled; and FIG. 8 is a perspective view of the optical viewer.

DESCRIPTION OF INVENTION

1. The Converter Assembly:

Referring now to FIG. 1, there is shown a stereoscopic converter assembly in accordance with the invention composed of three main components: an optical attachment 10, an electro-optical viewer 11 and an electronic controller unit 12 for activating either the attachment or the viewer, depending on the mode of operation. Both the optical attachment and the viewer are provided with alternately-actuated shuttering elements.

The converter assembly is usable in conjunction with a standard 2-D closed circuit television system constituted by a video camcorder 13 and a TV monitor 14. In practice, the video camcorder may be a commercially available consumer product, such as the JVC model GR-C7U featuring a VHS-C video format, or a Magnavox CCD HQ camcorder which includes a rechargeable battery. TV monitor 14 may be any commercially available, high quality monitor of the direct viewing or projection type.

When the closed circuit TV system operates in its recording mode, lens 16 of video camera 15 is trained on the scene or subject to be recorded, and the composite video signal generated in the video camera is fed to a video cassette recorder (VCR) 17 to produce a 2-D recording of the scene. When the system operates in the playback mode, the VCR plays back the video recording to produce a composite video signal that is fed to TV monitor 14 on whose screen the recorded scene is exhibited.

Thus, as shown in FIG. 2, in the recording mode the composite video signal yielded by camcorder 13 is applied to controller unit 12 which is responsive to vertical sync pulses derived from this signal to activate the shuttering elements of the optical attachment 10. These elements act to present alternately to camera lens 16 of camcorder 13 left and right eye images of the scene being viewed, this action resulting in a 3-D recording.

In the playback mode as shown in FIG. 3, the recording played back by camcorder 13 yields a composite video signal which is applied to TV monitor 14, controller unit 12 in response to the vertical sync pulses derived from this signal then activating the shuttering elements of viewer 11 alternately to present to the left and right eyes of the observer, the corresponding screen images, thereby affording a stereoscopic presentation.

2. The Optical Attachment:

As shown in FIGS. 4 and 5, optical attachment 10 of the assembly which has a box-like form is provided on its front wall with a pair of spaced left and right windows $W_1$ and $W_r$ and on its rear wall with a port $W_p$ in optical registration with right window $W_r$. Behind right window $W_r$ is a right light valve or shutter $S_r$, while interposed between shutter $S_r$ and rear window $W_p$ at a 45 degree angle with respect to the optical axis of shutter $S_r$ is a beam splitter BS. Perpendicular to right shutter $S_r$ is a left shutter $S_1$.

Behind left window $W_1$ is a reflecting mirror M disposed at a 45 degree angle with respect to the optical axis of this mirror. When attachment 10 is mounted in front of lens 16 of the camcorder, the lens is then in registration with port $W_p$. What the lens then sees depends on which shutter is activated, and is indicated by the dashed lines in FIGS. 4 and 5.

Thus, as shown in FIG. 4, when right shutter $S_r$ is rendered opaque and left shutter $S_1$ is transparent, then what lens 16 sees along the optical path which passes linearly through beam splitter BS is intercepted by opaque right shutter $S_r$. What it sees through the optical path reflected by beam splitter BS and passing through transparent left shutter $S_1$ is the image entering left window $W_1$ and reflected by mirror M. Hence in this state, lens 16 sees only a left-eye image of the scene or object being viewed.

When, however, as shown in FIG. 5, right shutter $S_r$ is transparent and left shutter $S_1$ is then rendered opaque, what lens 16 sees through the path passing linearly through beam splitter BS and transparent right shutter $S_r$ is the righteye image of the scene which enters right window $W_r$; for the left eye image entering window $W_1$ and reflected by mirror M is blocked by the then opaque shutter $S_l$.

In practice, the left and right light valves or shutters $S_1$ and $S_r$ may be of the liquid crystal or any other solid state type, such as those disclosed in the above-identified prior art patents. In the absence of an applied drive voltage, a liquid crystal shutter is transparent; but when a drive voltage is applied thereto, it is rendered opaque. In the recording mode, controller unit 12 functions to alternately activate shutters $S_1$ and $S_r$ of attachment 10 so that light from the scene being viewed by video camera lens 16 is directed into the lens by each shutter when in the transparent state.

While in FIGS. 4 and 5 the arrangement is such that lens 16 of the camcorder is in alignment with right window $W_r$ of attachment 10 and beam splitter BS is interposed between this window and the lens, in practice the attachment may be reversely arranged. In this reverse arrangement, lens 16 is aligned with left window $W_l$, with the beam splitter BS then being interposed between this window and the lens, with mirror M then being behind right window $W_r$. The preferred attachment arrangement depends on the geometry of the camcorder for which it is intended, and in some instances, it may be necessary to extend the attachment to the left of the camcorder rather than to the right thereof.

3. Operation of Assembly:

As shown in FIG. 1, electronic controller unit 12 includes a vertical sync pulse detector 18. In the recording mode, applied to this detector is the composite video signal yielded by video camera 15 of the camcorder, while in the playback mode, applied thereto is the composite video signal yielded by VCR 17 of the camcorder. In operation, detector 18 acts to extract the vertical sync pulses which identify the field scans. It may be of the type disclosed in the above-identified Jurisson et al. patent or in the Roese patent '529.

To ensure the proper left-right phasing of the video frames during playback, the output of detector 18 is applied to an odd/even field differentiator 19. This differentiation function can be carried out by separate vertical and horizontal sync detection and the use of one-shot timers and associated logic gates to sense the early onset of the first horizontal line relative to the vertical sync pulse in each field. In practice, these functions can be carried out by a National Semiconductor LM 1881 integrated circuit chip.

The respective outputs of differentiator 19 are applied to a two-channel solid state switch 20 which acts to alternately apply the output of a liquid crystal driver oscillator 21 to a left driver 22 and to a right driver 23.

Viewer 11, which is in the format of eyeglasses, is provided with left and right valves or shutters $V_1$ and $V_r$. When the system operates in the playback mode, these shutters are connected to left and right drivers 22 and 23 of controller unit 12. In the recording mode, drivers 22 and 23 are connected respectively, to shutters $S_1$ and $S_r$ of attachment 10.

The controller unit includes a battery supply or power pack which energizes all electronic components of the unit and supplies through the drivers the required activating voltages for the light valves $V_1$ and $V_r$ of the viewer or the shutters $S_1$ and $S_r$ of the attachment, depending on the mode of operation.

4. Mounting of Assembly:

As shown in FIGS. 6 and 7, a preferred mounting arrangement for the converter assembly makes use of an L-shaped mounting bracket 24 on whose short vertical arm is secured optical attachment 10 which is provided with a cable 25 terminating in a stereo jack 26. This jack is received in a female socket in controller unit 12 to connect the left and right drivers to the light shutters of the attachment.

The long horizontal arm of bracket 24 is provided with a tripod mounting bolt 27 which screws into the standard female tripod mount on the underside of portable camcorder 13, thereby physically linking the camcorder to optical attachment 10, as shown in FIG. 7. Camcorder 13, in addition to lens 16, is provided at its rear with a power pack 28. Controller unit 12, which is highly compact, is removably secured to power pack 28, a Velcro attachment being suitable for this purpose.

Thus, the user of the converter assembly in the recording mode is provided with a self-sufficient, relatively light weight arrangement which can be handheld to record stereoscopic images of a scene, or, if desired, stably mounted on a tripod.

When operating in the recording mode, the camcorder is connected to the TV monitor, and in that mode, optical viewer 11 must be plugged into controller unit 12. For this purpose, viewer 11, as shown in FIG. 8, is provided with a cable 29 terminating in a stereo jack 30 to connect the light valves $V_1$ and $V_r$ to the respective drivers of the controller.

5. Modifications:

The invention is not limited to TV systems using interlaced fields, for the only requirement is that alternate fields be displayed at a rate sufficiently high to effect perceptual fusion due to the phenomenon of visual persistence, regardless of whether these fields are interlaced or non-interlaced. Thus, the invention is compatible with the non-interlaced PAL format used in Europe.

It is also to be noted that the invention is applicable to liquid crystal shutters of the two types currently available commercially, one type being such that the crystal is rendered opaque when a voltage is applied thereto and becomes transparent in the absence of an applied voltage, the other type being such that a normally opaque crystal is rendered transparent when a voltage is applied thereto.

While the attachment is described as having a beam splitter and a mirror each disposed at 45 degree angles, in practice these angles may be made manually adjustable so that the user can manipulate the angles in order to converge or diverge the light paths, depending on particular applications for the system. Thus, when recording the images of an object very close to the video camera, by converging the light paths one can thereby maximize the common planar field of view that is shared by both the left and right video fields.

Because the controller unit is in a highly compact integrated-circuit form, in practice it may be physically combined with the optical attachment to provide a unitary assembly, thereby obviating the need for an external cable between the attachment and the controller. This assembly may be mounted in front of the camcorder by means of a bracket, as described, or by other mechanical coupling devices. Thus in FIG. 1, controller unit 12 and attachment 10 may be joined to form a unitary assembly.

In some instances, it may be desirable to provide a 3-D presentation in real time, in which case the output of the video camera is not recorded but is processed to provide an input signal that is applied to a TV monitor whose screen is viewed through the 3-D electro-optical viewer. This makes it possible, for example, to observe at a remote position a surgical procedure in which a video camera is trained on the surgical site, and for a viewer to follow the procedure in progress in 3-D.

To this end, the unitary assembly of the optical attachment and controller unit is coupled to the lens of the video camera, there being no need for a VCR or camcorder. However, in this situation, if one wishes to make a 3-D record of the surgical procedure, the composite video signal from the video camera may, in addition to being fed to the TV monitor, at the same time be recorded in a VCR or compact disc video recorder for future playback.

While there has been shown and described a preferred embodiment of a stereoscopic converter assembly in accordance with the invention for a closed circuit 2-D television system, it will be appreciated that many changes and modifications may be made therein without, however, departing from the essential spirit thereof. Thus, the expedients used to avoid flicker as disclosed in the above-identified prior art patents may be included in the 3-D converter assembly.

We claim:

1. A stereoscopic converter assembly usable in conjunction with a 2-D TV system constituted by a video camera section having a monocular lens to yield a composite video signal representing an image of a scene viewed by the lens, a video cassette recorder section operable in a recording mode to record the composite video signal yielded by the camera section and in a playback mode to feed this signal to a TV monitor on whose screen the recorded image is exhibited, said video camera section and said recorder section being unified to form a battery-powered camcorder usable at a site remote from the monitor and being provided with a camera section output and a recorder section output, said converter comprising:

(a) a self-sufficient optical attachment joinable to said camcorder for placement in front of the lens of the video camera section and provided with left and right eye voltage-activated light shutters which when alternately activated present to the lens alternate left and right eye images of a scene, said camcorder and said attachment being detachably supported in operative relation on a mount;

(b) an electro-optical viewer provided with left and right eye voltage-activated light valves through which the images exhibited on the screen of the monitor are viewed by an observer;

(c) a self-sufficient battery-powered controller unit usable at said site selectively coupled either to the optical attachment or to the electro-optical viewer, the unit in said recording mode being coupled to the output of the video camera section and being responsive to the composite video signal yielded thereby to apply activating voltages alternately to said right and left shutters of the attachment whereby there is then recorded in the recorder section left and right eye images of the scene, the unit in said playback mode in which the recorded left and right eye images are exhibited on the screen being coupled to the output of the recorder section and then being responsive to the composite video signal yielded by the recorder section to apply activating voltages alternately to the left and right eye valves of the viewer to present the left and right eye images on the screen alternately to the left and right eyes of an observer, the corresponding screen images, thereby affording stereoscopic vision, whereby when the converter is combined with said camcorder, the combination functions as a 3-D TV system, and when said converter is removed from the camcorder, the system reverts to a 2-D TV system.

2. An assembly as set forth in claim 1, wherein each frame of the composite video signal is constituted by first and second interlaced fields, said left eye image being represented by one of the fields and the right eye image by the other field.

3. An assembly as set forth in claim 1, wherein each frame of the composite video signal is constituted by first and second non-interlaced fields, said left eye image being represented by one field and said right eye image by the other field.

4. An assembly as set forth in claim 1, wherein the shutters of the attachment and the light valves of the viewer are formed by liquid crystal elements which are normally transparent and which are rendered opaque when an activating voltage is applied thereto.

5. An assembly as set forth in claim 1, wherein said controller unit includes a vertical sync pulse extractor to separate from the composite signal applied thereto in the recording mode or in the playback mode the vertical sync pulses, and a two-channel switch responsive to said sync pulses to control the application of said activating voltages to said attachment or said viewer.

6. An assembly as set forth in claim 5, wherein said switch controls the alternate operation of left and right drivers which supply said activating voltages.

7. An assembly as set forth in claim 6, further including a driver oscillator whose output is applied by said switch alternately to said drivers.

8. An assembly as set forth in claim 1, wherein said camcorder is provided at its rear with a power pack, and said controller unit is attachable to said pack so that the camcorder, the power pack and the controller unit are integrated and are supported on said mount to provide a compact assembly usable at said site.

9. A stereoscopic converter assembly usable in conjunction with a 2-D closed circuit TV system constituted by a video camera having a monocular lens to yield a composite video signal representing an image of a scene viewed by the lens, a video cassette recorder to record the composite video signal and in playback to feed this signal to a TV monitor on whose screen the recorded image is exhibited, said video camera and said recorder being unified to form a camcorder, said converter comprising:

(a) an optical attachment placeable in front of the lens and provided with left and right voltage-activated light shutters which when alternately activated present to the lens alternate left and right eye images of a scene, said camcorder being provided with a female tripod mount and being supported on a horizontal arm of an L-shaped bracket provided with a tripod mounting bolt that enters the female mount, said bracket and vertical arm having the attachment affixed thereto at a position in front of the lens;

(b) an electro-optical viewer provided with left and right voltage-activated light valves through which the images exhibited on the screen are viewed by an observer; and (c) a self-sufficient controller unit selectively coupled either to the attachment or to the viewer, the unit in a recording mode being responsive to the composite video signal yielded by the video camera to apply activating voltages alternately to said right and left shutters of the attachment whereby there is then recorded left and right eyes images of the scene, the unit in a playback mode in which the recorded left and right eye images are exhibited on the screen then being responsive to the composite video signal yielded by the recorder to apply activating voltages alternately to the left and right valves of the viewer to present alternately to the left and right eyes of the observer, the corresponding screen images thereby affording stereoscopic vision.

* * * * *